US011578703B2

(12) United States Patent
Mancini

(10) Patent No.: US 11,578,703 B2
(45) Date of Patent: Feb. 14, 2023

(54) IN SITU GEOTHERMAL POWER

(71) Applicant: Adam Mancini, Hagaman, NY (US)

(72) Inventor: Adam Mancini, Hagaman, NY (US)

( * ) Notice: Subject to any disclaimer, the term of this patent is extended or adjusted under 35 U.S.C. 154(b) by 0 days.

(21) Appl. No.: 17/386,940

(22) Filed: Jul. 28, 2021

(65) Prior Publication Data

US 2021/0355921 A1 Nov. 18, 2021

Related U.S. Application Data

(63) Continuation-in-part of application No. 16/804,625, filed on Feb. 28, 2020, now abandoned.

(51) Int. Cl.
*F03G 4/00* (2006.01)
*H02K 7/18* (2006.01)

(52) U.S. Cl.
CPC ........... *F03G 4/001* (2021.08); *H02K 7/1823* (2013.01); *H02K 2213/12* (2013.01)

(58) Field of Classification Search
CPC ......... F03G 4/001; F03G 4/033; F03G 4/029; H02K 7/1823; H02K 2213/12; F24T 2010/53; F24T 10/13; Y02E 10/10
USPC ............................................ 60/641.2–641.4
See application file for complete search history.

(56) References Cited

U.S. PATENT DOCUMENTS

| 3,905,196 | A | * | 9/1975 | Govindarajan | ........... F03G 7/04 60/641.4 |
| 6,073,448 | A | * | 6/2000 | Lozada | ................... F24T 10/10 60/641.2 |
| 7,146,823 | B1 | * | 12/2006 | Wiggs | ..................... F24T 10/30 62/260 |
| 9,978,466 | B2 | * | 5/2018 | Lakic | ................... H02K 7/1823 |
| 2011/0061832 | A1 | * | 3/2011 | Albertson | ............... F24F 3/001 165/45 |
| 2012/0312598 | A1 | * | 12/2012 | Cheng | ....................... E21B 7/00 175/50 |

* cited by examiner

*Primary Examiner* — Hoang M Nguyen

(57) ABSTRACT

A method of generating electricity from geothermal energy utilizing an in situ closed loop heat exchanger deep within the earth using a recirculating heat transfer fluid to power an in situ modular turbine and generator system within a vertical, large bore, deep, tunnel shaft. The shaft length and diameter are dependent on the shaft temperature and sustaining heat flux. The method further includes methods of deep shaft boring and excavating, liner placement and sealing, shaft transport systems, shaft Heating, Ventilation, and Air Conditioning, and operations and maintenance provisions. The method has few global location restrictions, maximizes thermal efficiency as to make power generation practical, has a small site surface footprint, does not interact with the environment, is sustainable, uses renewable energy, and is a zero release carbon and hazardous substance emitter.

4 Claims, 2 Drawing Sheets

IN SITU GEOTHERMAL POWER

This application is a continuation-in-part (CIP) of prior application Ser. No. 16/804,625, filed on 28 Feb. 2020.

BACKGROUND

The geothermal energy contained within the earth is a renewable energy. The production of geothermal power typically includes the extraction and conversion of geothermal thermal energy into electricity through a heat exchanger(s) and a turbine generator via a fluid heat transfer medium, such as water. In current commercial geothermal power plants, the geothermal thermal energy is contained within a mile or two from the earth's surface in the form of either hot water or hot rocks. In hot water power plants, the heat transfer medium is the hot water itself and may be used directly or via a heat exchanger to supply the turbine generator. This method depends on geothermal activity at the earth's surface, and these locations are relatively rare on the planet. In hot rock power plants, fluid is pumped into natural or man-made fractures within the hot rock and collected after being heated for use. This method is typically called Enhanced Geothermal Systems (EGS). EGS technology may negatively result in manmade seismic activity and other unknown hazards from the fracturing process, which may contain toxic substances, and loss of fluid recovery within the earth. EGS is an open loop system, where there is no barrier between the heat transfer fluid and the environment. Many EGS projects that were started or planned across the globe have been halted due to these potential public and environmental hazards. U.S. Pat. No. 9,376,885 is for a typical open EGS style system.

Other geothermal power plant concepts describing closed loop systems rely on the transport of geothermal energy through wells (U.S. Patent examples: U.S. Pat. Nos. 10,527,026, 9,423,158, 9,404,480, 9,394,771, 9,181,931, 8,650,875, 8,616,000, 7,320,221, 3,905,196, 6,073,448, and 9,978,466 among others). Those wells have a small diameter borehole similar to fossil oil and gas extraction wells. At several miles of length and the small well pipe diameters, the thermal energy loss, even with pipe insulation, is too great to efficiently generate electricity from power plants that are on the earth's surface. As well pipe diameters become smaller and pipe lengths reach miles, the energy dissipation along the well to the surface turbine increases to the point where the system is not practical to produce electricity on a coal, gas, or nuclear plant scale. U.S. Pat. No. 8,677,752 discusses the use of abandoned mines and the use of more conventional power systems.

Many countries are shutting down fossil fuel and nuclear power plants due to public safety, economics, and environmental concerns. The solar, wind, hydro and other renewable energy power plants combined are not enough to replace the loss in electricity supply from these shutdown plants nor the increase from future electricity demand.

Consistent with the Paris Agreement, there is a current and future need for a zero hazardous release, zero carbon emission, large scale electric power production system with improved safety factors that utilize renewable and sustainable energy.

SUMMARY

This Summary is provided to introduce a selection of concepts in a simplified form that are further described below in the Detailed Description. This Summary is not intended to identify key features of the claimed subject matter, nor is it intended to be used as an aid in determining the scope of the claimed subject matter.

Contrary to the above methods, In Situ Geothermal Power (IGP) is a closed loop system separately contained within an excavated, large diameter, vertical tunnel shaft. The shaft will have a minimum diameter of four feet to differentiate the shaft from prior art wells that are typically under three feet in diameter. The IGP shaft may typically have a diameter of thirty feet to fit an industrial sized turbine generator and system components.

The length of the shaft is dependent on reaching a sustaining heat flux and temperature. Typical shaft depths are four to twelve miles. The shaft is lined and sealed during the excavation process.

Heat exchanger tubes are placed at the bottom of the shaft and fixed in place with a high conductivity grout. The size, number and length of the tubes are a function of shaft geothermal properties and desired electrical output. Typically, there may be 10,000, one inch diameter tubes over a quarter mile.

Above the heat exchanger, a common shaft turbine generator system is coupled to the steam conduits. The turbines and generator are modular in design to allow routine coupling and decoupling. Coupling and decoupling of the modular components allow for routine travel up and down the shaft for maintenance at the surface.

The transport of modular components up and down the shaft is accomplished by an independent engine that rides on a rail or toothed infrastructure that is supported by the shaft liner. This removes any cable and crane type transport system that will not efficiently function at these depths under heavy loads.

Once the heat transfer fluid travels from the turbines to the condenser, the fluid is returned to the heat exchanger to recirculate the fluid and maintain the closed loop design.

In a closed loop system, the heat transfer fluid is contained, therefore, prevented from interacting with the environment. IGP does not require rock fracturing and the injection of high pressure fluids which may contain toxins. Therefore, the risk of IGP generating seismic activity from fracturing is zero. The IGP geothermal energy source is from the hot rock below the earth's surface at a depth where temperatures and a sustaining heat flux can maintain a consistent heat transfer to the closed loop fluid system. Unlike currently operating surface geothermal power plants, IGP may be sited anywhere on the planet. The shaft depth will vary depending on the IGP site location and associated temperature and heat flux parameters in conjunction with the desired energy output. The heat exchanger(s) is near the bottom of the shaft and is grouted "in place." This is one reason why IGP is named "in situ." The shaft is not a small diameter well, but rather a vertical tunnel of substantial diameter designed to accommodate some or all of the power plant system components "within the shaft." This is another reason why IGP is named "in situ." The main plant components that may reside in the shaft are modular components designed to fit into the working diameter of the shaft. For example, above the main heat exchanger(s) may be a dryer and then a rotary turbine(s) and electric generator. The main condenser may be nearer the earth's surface to take advantage of the natural rock's ambient cooling properties and heat transfer temperatures prior to returning the heat transfer fluid to the main feed pumps to continue recirculation.

The IGP process is described in the present application.

In accordance with the embodiment of the present disclosure, a method of affixing a closed loop heat exchanger(s)

near the bottom of a deep, bored, tunnel shaft to exchange heat from the earth to a heat transfer fluid which powers a turbine generator for electricity production is provided.

In the embodiment described herein, a method may include the drilling of test wells near the IGP location for data collection during the siting phase to determine shaft and system design parameters. The deep shaft is not a small diameter well, but rather a vertical tunnel of substantial diameter to accommodate some or all power plant system components. For example, the vertical tunnel shaft may be dug by Tunnel Boring Machine (TBM), vertical boring machine, combination, or other shaft excavating device(s). A TBM is self-propelled and alleviates the problems associated with long drill rods. A TBM or similar machine may drill, excavate, and place and seal the shaft wall liner at the same time. Both manned and remote controlled equipment may be utilized. The shaft diameter is dependent on the rock input and power output design parameters to accommodate the modular power plant components.

In the embodiment described herein, a method may include one single or multiple heat exchanges placed at various locations near the shaft bottom or juxtaposition. A heat exchanger may comprise a plurality of tubes, for example; several thousand tubes. For example, a heat exchanger may be designed up to several hundred feet or more in length dependent on the sustaining heat flux and shaft rock temperature parameters.

In the embodiment described herein, a method may further include water or alternate fluid or gas as the heat transfer medium.

In the embodiment described herein, a method may further include a secondary or binary heat transfer system. This alternative is dependent on the shaft temperatures and heat fluxes reached.

In the embodiment described herein, the system components may be entirely contained within the shaft, partially contained within the shaft, or located outside the shaft dependent on the location specific design and local thermal parameters.

In the embodiment described herein, the condenser may or may not be located within the shaft dependent on the location specific design and local thermal parameters.

In the embodiment described herein, the condenser may or may not require a secondary cooling fluid or gas dependent on the location specific design and local thermal parameters.

In the embodiment described herein, the system components within the shaft located above the in situ heat exchanger are modular and may be routinely disconnected from the system and conveyed to the surface for maintenance.

In the embodiment described herein, the shaft is lined and sealed with a structural pressure barrier and earth boundary. The boundary inhibits shaft collapse and earth's corrosive substances from interacting with the closed loop IGP system. The liner may be reinforced concrete or other material with the annulus between the liner and earth filled and sealed.

In the embodiment described herein, the shaft may contain a transfer system such as rail(s) or conveyor for the transport of system components, excavated material, and work crews.

In the embodiment described herein, the shaft may require a Heating, Ventilation, and Air Conditioning (HVAC) system to control the shaft ambient atmosphere, when needed.

In the embodiment described herein, the shaft may have equipment, maintenance, and operating room(s) juxtaposition to the shaft at varying depths.

In the embodiment described herein, the power plant system components may include fluid separators and dryers, pumps, motors, high pressure and low pressure steam turbines, electric generator, condenser, plus all support systems.

In the embodiment described herein, an insulated electric conductor line from the generator may feed a standard transformer on the earth's surface prior to supplying a standard electric switchyard and grid.

In the embodiment described herein, the main control room may be on the earth's surface. Most instrumentation and controls may be remote, and remotely operated from the surface or within subsurface shaft rooms.

DESCRIPTION OF THE DRAWINGS

The drawings are for illustrative purposes. The drawings shown are not restrictive to the design and are not to scale.

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of the features described herein.

Embodiments of the present disclosure relate to methods for the design of an In Situ Geothermal Power (IGP) plant. An IGP plant may be sited anywhere on the planet. Certain locations are less or more desirable. A less desirable location, dissimilar to an Enhanced Geothermal Systems plant, is an area that exhibits elevated seismic and near surface geothermal activity. A more desirable location is an area that may benefit from a low cost electricity supply, for example, an impoverished area that is isolated from an electric grid, that has an average to low seismic activity, as well as an average to high geothermal gradient.

Figure 1:
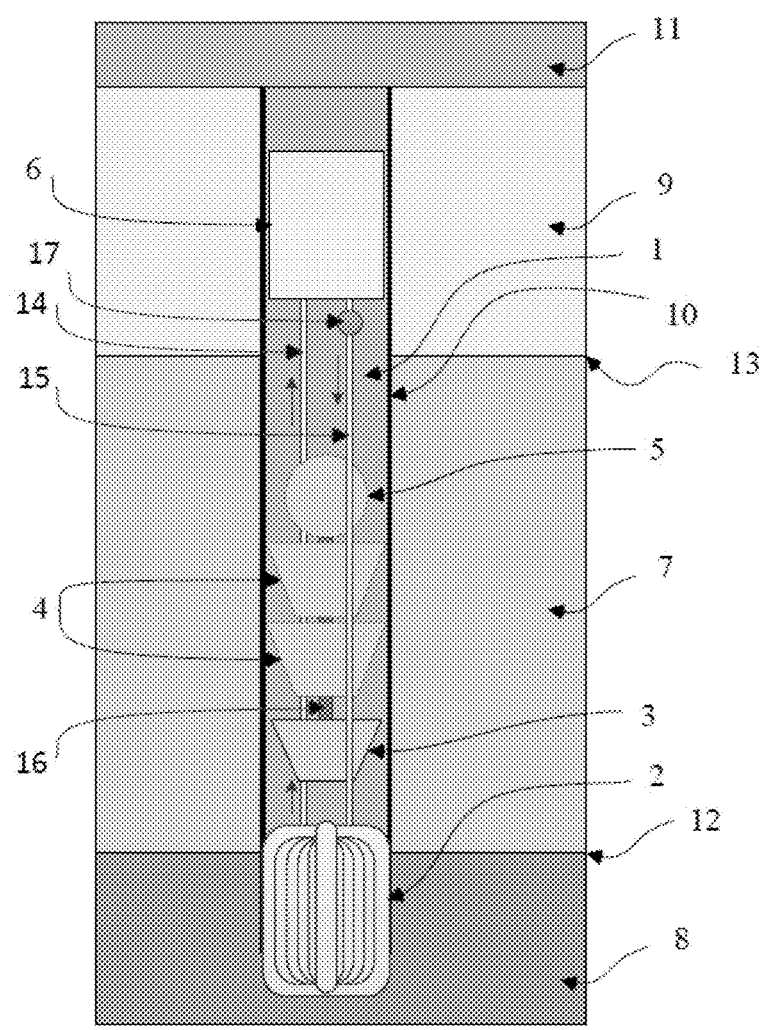
FIG. 1 is a cross-sectional illustrative view of a typical IGP plant where all major system components are modular in design and contained within the deep shaft in accordance with the embodiment of the present disclosure.

Referring to FIG. 1, a deep tunnel shaft 1 is first excavated. The shaft is not a small diameter well, but rather a vertical tunnel of substantial diameter to accommodate some or all power plant system components. The shaft may be vertical, at an angle, or helical. The major regions of the shaft include a near surface region 9, a geothermal heat exchanger region 8, and a region in between the surface and heat exchanger region 7. These regions 7, 8, 9 are defined by transitions, which are shown as lines 12, 13. The surface of the earth is above the shaft 11. Current Tunnel Boring Machines (TBM) and similar vertical boring technology may be utilized to bore the shaft, excavate the earth, and seal the shaft with a structural liner 10. The liner provides a boundary that inhibits shaft collapse and any of earth's corrosive or other hazardous substances from interacting with the closed loop IGP system. The liner may support an integral transport system such as a rail(s) or conveyor. This integral transport system may negate the use of cranes and rigging that could fail or be inefficient under such long distances. The integral transport system may utilize a modular engine to transport equipment, excavated material, crews, and modular components down and up the shaft. The TBM or similar may be left at the bottom of the shaft upon completion of the excavation.

Completion of the shaft is based on several design parameters. For example, a shaft depth may typically reach 4 to 12 miles dependent on the site location's geothermal properties. The main design parameters are rock temperature and sustaining heat flux. The temperature is simply the temperature of the surrounding shaft rock. Ideal temperatures may be in the hundreds of degrees Celsius. The heat flux is considered as the rate at which heat is replenished by the earth when removed. Referring to FIG. 1, these ideal design parameters are located in region 8. The heat flux rate will be a design parameter in determining the overall heat exchanger(s) dimensions and type. These design parameters will vary based on the shaft site location.

Referring to FIG. 1 for a typical heat exchanger location 8, the deep shaft may reach a rock temperature well above the boiling point of water. However, some shafts may need to stop excavation for local geological reasons and attain a lower temperature. At lower temperatures, a secondary heat transfer system or an alternate fluid or gas with a lower boiling point than water may be utilized in the IGP design. This maintains design flexibility while still being a closed loop system. For a typical location, the heat flux required may be based on the desired design of the plant electricity output. The heat flux minimum value will replace the heat loss removed from the heat exchanger(s).

Figure 2:
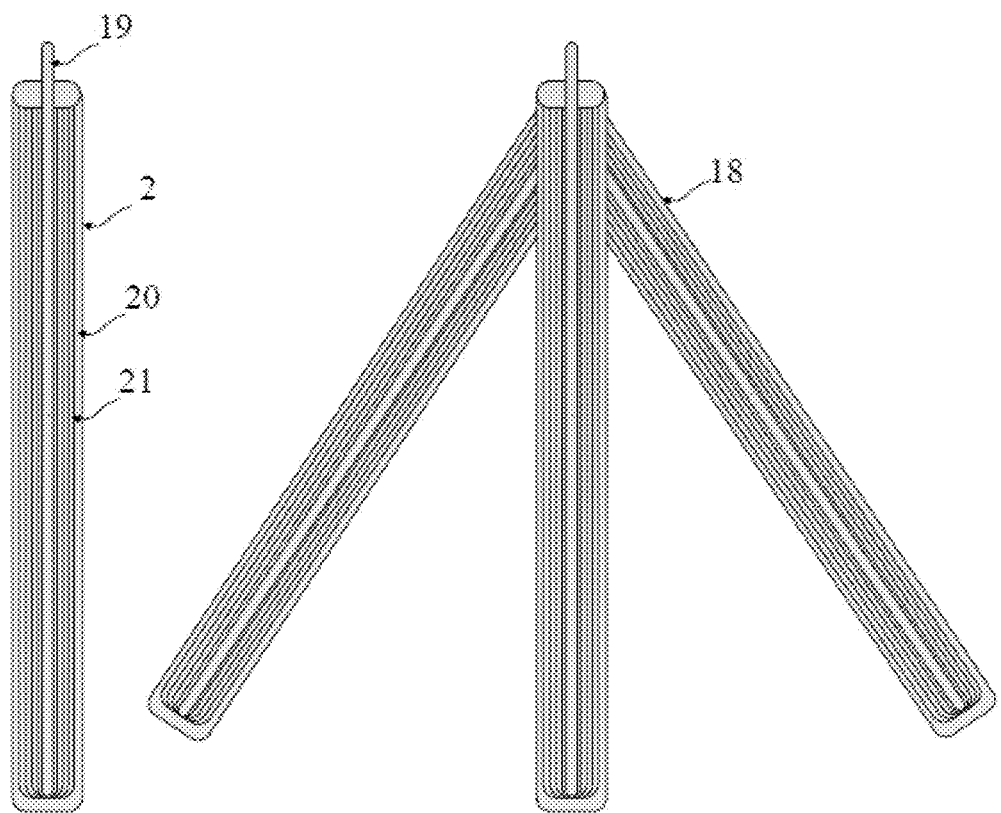
FIG. 2 is a cross-sectional illustrative view of example in situ heat exchanger configurations where the location specific design is dependent on the shaft's sustaining heat flux and temperature.

Referring to FIG. 2, a heat exchanger may have different designs. The heat exchanger type, size and shape are based on the heat flux attained and the desired output of the plant. This maintains design flexibility between the heat flux, heat exchanger design, and output desired. For example, in a location where heat flux is very low, multiple shafts may be bored for the placement of multiple heat exchangers 18 to attain the desired output. Heat exchanger design types are not limited, such as u-tube or once-through types.

Referring to FIG. 2, the heat exchanger 2 is at the shaft bottom and is affixed to the shaft via high conductivity grout 20 or similar. Grout conductivity may be increased with additives such as graphite, aluminum, iron, or similar. Setup inhibitors and/or non-water based grouts may be used due to the high temperature application where water flashing to steam may impede proper setup. Alternatively, coolant may be applied to the heat exchanger during setup to control temperature. Typically, thousands of heat exchange tubes 21 line the shaft supplied by a common header 19 at shaft centerline. U-tube style and other heat exchanger types are also within the scope of design. The individual tube diameter design is also a function dependent on the shaft temperature parameters. Based on the temperature parameters, the total tube length may typically range between feet and miles.

For an example using water as the fluid heat transfer medium; feed water is pumped downward into the top of the heat exchanger header, circulates upward through the grouted tubes, absorbs geothermal energy, and exists as steam to supply the steam turbines(s). Referring to FIG. 1, steam dryers, pumps, Heating, Ventilation, and Air Conditioning (HVAC), and other support systems are not shown.

As shown in FIG. 1, typically, the modular high pressure turbine 3, low pressure turbine(s) 4, and generator 5 share the same rotor 16, and are placed relatively close to the heat exchanger 2 within the shaft to minimize thermal energy dissipation. The closed loop system is defined by the connective piping 14 from the heat exchanger that is sequentially connected to the turbines and condenser, and then piped 15 back to the heat exchanger by pump 17. The modular components may be located in a region 7 away from the heat exchanger region 8 where harsh ambient conditions exits. The typical electric generator 5 is modular and sized for the design parameters and desired plant output. When the shaft is many miles deep, the energy in the fluid will dissipate while traveling to a surface turbine. Thermal efficiency is increased when placing modular plant system components as close to the heat exchanger(s) as the shaft ambient conditions allow. These in situ modular components are designed to remotely couple and decouple for transport to and from the surface 11 for maintenance.

The shaft may or may not be pressurized dependent on the local site design parameters. A typical shaft is not pressurized or sealed. The shaft is structurally lined and sealed from the earth. The ambient air within the shaft, therefore, is not naturally pressurized and may only be a few atmospheres at depth. Shaft ambient air temperatures and chemistry may be maintained as designed with the use of an HVAC or similar system. The HVAC system may make use of the above ground atmosphere to maintain cooling and chemistry.

FIG. 1 shows a condenser 6. The condenser may be placed in the shaft region 9 where the shaft temperature and shaft length provide enough cooling to make it possible to return the spent fluid back to the heat exchanger. Based on the design parameters and the availability of conventional surface cooling options specific to the site location, an above ground or enhanced shaft condenser cooling system may be utilized.

A typical IGP plant may have the electric generator connected to an insulated, high voltage, output line that conveys electricity to a standard surface transformer(s) prior to connecting to a standard switchyard and grid. Depending on the length of the shaft and other design parameters, a modular transformer may also be placed in the shaft prior to the output line exiting the shaft.

The modular component design used in a typical IGP plant allows for periodic decoupling and conveyance to the surface for maintenance or replacement.

Multiple IGP shafts at one plant location may serve to smooth power transmission outages from both planned maintenance and unscheduled maintenance. Plant output is dependent on location and associated site parameters, but may be designed at the typical fossil fuel plant MWe range per IGP shaft. This output is significantly higher than other renewable power plants like solar and wind farms. The typical IGP plant surface footprint is considered small as compared to fossil, nuclear, solar, or wind power plants of similar MWe output.

The IGP fuel source is the geothermal energy from the earth and is considered renewable and sustainable. The carbon emissions from an IGP plant are near zero. The IGP plant system is a closed loop system that does not directly interact with the earth itself, therefore, once the grouted heat exchanger(s) is in place, there are no generating sources of manmade seismic activity as with fracturing, or conditions where toxins and fluids are released into the environment.

IGP is unlike any current geothermal process in that it requires the excavation of a deep vertical shaft of sufficient diameter to place a closed loop, grouted, in situ heat exchanger that supplies a power system of in situ modular components to maximize the plant's thermal efficiency.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiment(s) of the disclosure in which an exclusive property or privilege is claimed are defined as follows:

1. A method of producing electric power by operating a geothermal power plant, comprising the steps of:
   excavating a tunnel shaft that is greater than four feet in diameter, deep within the earth to provide a sustaining heat flux and geothermal energy;
   installing a plurality of permanently in-situ heat exchanger tubes at the bottom of the shaft contained within a conductive grout to transfer the geothermal energy to a heat transfer fluid;
   installing a modular turbine in the shaft above the heat exchanger, routinely coupling and decoupling the modular turbine from the power plant and moving said modular turbine to the surface for maintenance;
   installing a modular electric generator in the shaft above the turbine, routinely coupling and decoupling the modular electric generator from the power plant and moving said modular electric generator to the surface for maintenance;
   installing a modular condenser in the shaft above the turbine, routinely coupling and decoupling the modular condenser from the power plant and moving said modular electric generator to the surface for maintenance;
   installing a pump to recirculate the heat transfer fluid;
   installing connecting conduits for connecting and recirculating heat transfer fluid in a closed loop between the in-situ heat exchangers, the turbines, the condenser, the pump, and back to the in-situ heat exchangers;
   recirculating the heat transfer fluid through said conduits of the closed loop to drive the electric generator to produce electric power.

2. The method of producing electric power by operating a geothermal power plant as set forth in claim 1, comprising a further step of lining the tunnel shaft with a structurally reinforced, sealed, concrete liner to provide a structural and chemical boundary from the earth.

3. The method of producing electric power by operating a geothermal power plant as set forth in claim 2, comprising a further step of installing a transport infrastructure to the concrete liner to provide an independent engine riding on the infrastructure to transport modular system components, excavated material, equipment, and work crews up and down the shaft.

4. The method of producing electric power by operating a geothermal power plant as set forth in claim 1, wherein the connecting conduits are routinely coupled and decoupled to the in-situ heat exchangers, the turbines, the condenser, and the pump.

\* \* \* \* \*